(12) United States Patent
Jung

(10) Patent No.: US 7,869,605 B2
(45) Date of Patent: Jan. 11, 2011

(54) METHOD FOR GENERATING GROUP KEY

(75) Inventor: Bae-eun Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1296 days.

(21) Appl. No.: 11/410,245

(22) Filed: Apr. 25, 2006

(65) Prior Publication Data

US 2007/0019807 A1    Jan. 25, 2007

(30) Foreign Application Priority Data

Jul. 23, 2005    (KR) .................. 10-2005-0067063

(51) Int. Cl.
*H04L 9/00* (2006.01)
*H04L 9/08* (2006.01)
(52) U.S. Cl. ........................ 380/283; 380/44
(58) Field of Classification Search ............... None
See application file for complete search history.

(56) References Cited

U.S. PATENT DOCUMENTS

| 6,240,188 | B1 * | 5/2001 | Dondeti et al. ............ 380/284 |
| 6,813,357 | B1 * | 11/2004 | Matsuzaki et al. .......... 380/279 |
| 7,103,185 | B1 * | 9/2006 | Srivastava et al. .......... 380/277 |
| 7,319,752 | B2 * | 1/2008 | Asano et al. ............... 380/44 |
| 7,778,423 | B2 * | 8/2010 | Martin et al. .............. 380/283 |

* cited by examiner

*Primary Examiner*—Kaveh Abrishamkar
(74) *Attorney, Agent, or Firm*—NSIP Law

(57) ABSTRACT

A method is provided for generating a group key, including sharing a plurality of secret keys with a plurality of nodes adjacent to a first node of the plurality of nodes, obtaining a plurality of function values using the plurality of secret keys and a result value using the plurality of function values, broadcasting the result value, receiving a plurality of result values generated using a method by which the result value has been obtained, from nodes of the plurality of nodes except for a corresponding node, and obtaining a group key using a plurality of function values extracted from the plurality of function values and the plurality of result values.

13 Claims, 2 Drawing Sheets

METHOD FOR GENERATING GROUP KEY

CROSS-REFERENCE TO RELATED APPLICATIONS

This application claims the benefit under 35 U.S.C. §119(a) of Korean Patent Application No. 10-2005-0067063, filed in the Korean Intellectual Property Office on Jul. 23, 2005, the entire disclosure of which is incorporated herein by reference.

BACKGROUND

1. Field

The following description relates to a method for generating a group key between nodes. More particularly, the following description relates to a method for efficiently generating a group key using a hash function.

2. Description of the Related Art

A plurality of multimedia devices in a home network often must share specific contents. In this case, the multimedia devices must first share a group key that is not exposed to the outside, to thereafter share the specific contents through the group key.

As essential technology of ubiquitous computing technology, a plurality of sensors are required to communicate and share information as to sensed external environments with one another to build a ubiquitous sensor network.

Even in this case, sensor nodes must share a group key to communicate and share sensed information with one another through the group key. Several methods for generating and sharing such a group key between nodes have been suggested.

However, in a ubiquitous computing environment in which nodes frequently enter and exit a sensor network, a method is required for efficiently generating a group key that can be shared by only sensor nodes existing at a time when sharing and communicating information and contents.

In a conventional method for generating a group key, a server is necessarily required for computing, storing, and transmitting a group key. However, although a method for generating a group key not using such a server can be used, an exponent is required to be sequentially computed in all of the sensor nodes in a sensor network.

Accordingly, in such conventional methods, time and cost efficiency cannot be provided whenever a group key is generated.

Accordingly, a need exists for a system and method for effectively and efficiently providing a group key.

SUMMARY

Accordingly, embodiments of the following description have been made to substantially solve the above-mentioned and other problems, and an aspect of embodiments of the following description are to provide a method for efficiently generating a group key using a hash function.

According to an aspect of embodiments of the following description, a method is provided for generating a group key applied to a plurality of nodes, comprising sharing a plurality of secret keys with a plurality of nodes adjacent to a first node of the plurality of nodes, obtaining a plurality of function values using the plurality of secret keys and a result value using the plurality of function values, broadcasting the result value, receiving a plurality of result values generated using a method by which the result value has been obtained, from nodes of the plurality of nodes except for a corresponding node, and obtaining a group key using a plurality of function values extracted from the plurality of function values and the plurality of result values.

The sharing of the plurality of secret keys with the plurality of nodes adjacent to the first node of the plurality of nodes may comprise sharing a first secret key with a first adjacent node of the plurality of adjacent nodes, and sharing a second secret key with a second adjacent node of the plurality of adjacent nodes.

The obtaining of the result value may comprise substituting the plurality of secret keys as values of a plurality of substitution values for a one-way function to obtain a plurality of function values, and performing an XOR operation on the plurality of function values to obtain the result value.

The plurality of substitution values may comprise a nonce value.

The nonce value may be generated by using time information.

The broadcasting of the result value may be performed through an authentication channel.

The sharing of secret keys may be performed by using an out of band method.

A plurality of secret keys of the first node can be pre-set and input.

According to another aspect of embodiments of the following description, a method is provided for generating a group key applied to a plurality of nodes, comprising sharing a first secret key with a first adjacent node of a plurality of nodes adjacent to a first node of the plurality of nodes and a second secret key with a second adjacent node of the plurality of adjacent nodes, substituting the first and second secret keys as values of a plurality of substitution values for a one-way function to obtain first and second function values and performing an operation on the first and second function values to obtain a result value, broadcasting the result value, receiving a plurality of result values from nodes of the plurality of nodes except for a corresponding node of the plurality of nodes, and performing an XOR operation on a plurality of function values extracted from the first function value and the plurality of result values to obtain a group key.

BRIEF DESCRIPTION OF THE DRAWINGS

The above and other aspects and features of embodiments of the following description will become more apparent by describing certain embodiments of the following description with reference to the accompanying drawings, in which.

Throughout the drawings, like reference numerals will be understood to refer to like parts, components and structures.

DETAILED DESCRIPTION

Figure 1:
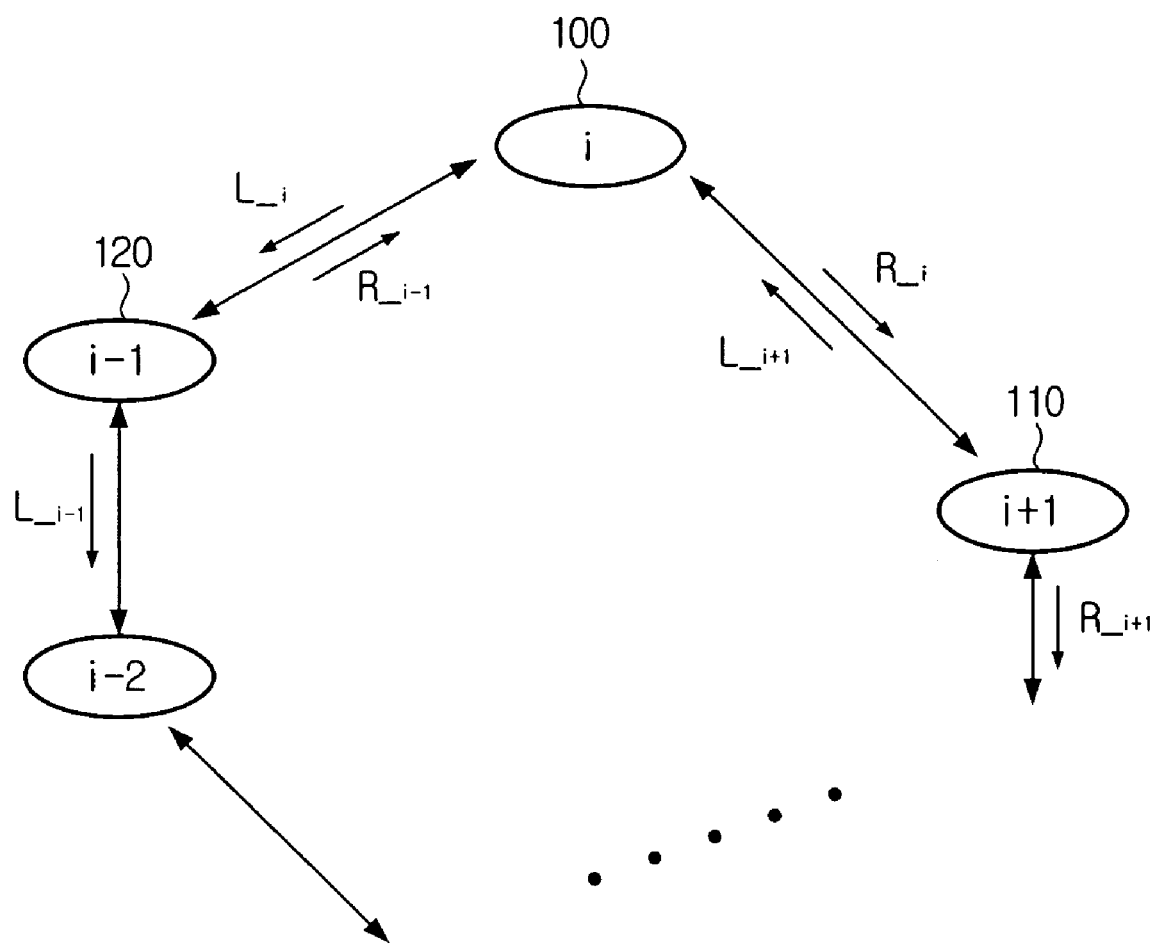
FIG. 1 is a view illustrating an exemplary group of nodes for adopting a method for generating a group key according to an example embodiment.

Exemplary embodiments of the following description will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

FIG. 1 is a view illustrating an exemplary group of nodes for adopting a method for generating a group key. Referring to FIG. 1, a conceptual "circle" of nodes constituting a node group are determined. Here, if a number of nodes constituting the node group is "N", all of the nodes share at least two secret keys with adjacent nodes, but are not limited thereto. The nodes may share three or more secret keys with adjacent nodes. However, for illustration purposes in embodiments of the present embodiment, the nodes share two secret keys with adjacent nodes.

If the nodes share two secret keys with adjacent nodes, an $i^{th}$ node "node_i" 100 shares a secret key "R_i" with an $i+1^{th}$ node "node_i+1" 110 on the right side of FIG. 1 and a secret key "L_i" on the left side of FIG. 1 with an $i-1^{th}$ node "node_i−1" 120.

The $i+1^{th}$ node "node_i+1" 110 shares a secret key R_i+1 with an $i+2^{th}$ node "node_i+2" (not shown) on the right side thereof and a secret key "L_i+1" with the $i^{th}$ node "node_i" 100 on the left side thereof. Thus, the secret key R_i of two secret keys stored in the $i^{th}$ node "node_i" 100 is the same as the secret key "L_i+1" of two secret keys stored in the $i+1^{th}$ node "node_i+1" 110. In the present embodiments, a method of sharing a secret key may be comprised of an out of band method.

According to the above-described exemplary methods, the nodes in the node group share two secret keys, i.e., first and second keys, with two adjacent nodes and store the two secret keys.

In embodiments described herein, the first and second secret keys may be generated in advance by a secret manager and then input to the nodes. Alternatively, the first and second secret keys may be generated by an arbitrary node and transmitted to an adjacent node to be shared with the adjacent node. The first and second secret keys may also be generated through communications between adjacent nodes.

A principle of using the secret key to generate a group key shared by the nodes of the node group will now be described through the following Equation (1) below, $$X\_i = H(L\_i, \text{Session ID})^{-1} \odot H(R\_i, \text{Session ID}) \quad (1)$$

wherein X_i denotes a result of an operation performed on a result value obtained by substituting a first secret key R_i and an arbitrary nonce session ID for a hash function, and an inverse of a result value obtained by substituting a second secret key L_i and an arbitrary nonce session ID for the hash function.

Here, the hash function compresses an input value having an arbitrary length into an output value having a predetermined length and having the following properties. In the hash function, it is substantially impossible to calculate an input value with respect to an output value and to search for an output value or another input value with respect to an input value. Also, it is substantially impossible to search for two different input values for calculating an output value.

The hash function satisfying the above-described characteristics is an important function for integrity, authentication, and preventing denial of data. In embodiments described herein, nodes inside a node group may share such a hash function.

Also, the hash function is an example of a one-way function. Thus, any one-way function, as well as a hash function, may be applied to the examples described herein.

An arbitrary nonce session ID is a value that all nodes can commonly obtain at a time for generating a group key and may comprise time information, a random figure, or the like. Preferably, the same value may not be repeated.

Here, an operation sign "$\odot$" denotes an arbitrary operation sign. If an operation is performed on an arbitrary value "A" and an inverse of the arbitrary value "A" using such an operation sign, a result value of the operation is an identity element of the corresponding operation sign.

In exemplary embodiments described herein, the above-mentioned operation may comprise an XOR operation, but is not limited thereto. In this case, an inverse of an arbitrary value of the corresponding operation may be the corresponding arbitrary.

That is, if the group node according to embodiments described herein comprises N nodes node_1, node_2, ..., node_i ..., and node_N, the N nodes node_1, node_2, ..., node_i ..., and node_N have a common hash function and calculate the result values "X_i" using their first and second secret keys "R_i" and "L_1" and a nonce value.

The N nodes node_1, node_2, ..., node_i ..., and node_N broadcast the result values X_i. Thus, the N nodes node_1, node_2, ..., node_i ..., and node_N receive result values X_i of the other nodes, excluding themselves. In embodiments described herein, broadcasting may be performed through an authentication channel, but is not limited thereto.

As a result, the N nodes node_1, node_2, ..., node_i ..., and node_N share a group key through an operation as shown in the following Equation (2) below.

$$B\_i = H(R\_i, \text{Session ID}) \quad (2)$$

As shown in Equation (2), the node node_i substitutes a first secret key R_i thereof and a nonce session ID to calculate a function value B_i.

$$B\_i+1 = X\_i+1 \odot B\_i \quad (3)$$

The node node_i performs an operation on a function value B_i of a result value of Equation (1) and a result value X_i+1 received from the node node_i+1 to calculate a function value B_i+1. The resulting value X_i+1 of Equation (3) can be expressed as, $$X\_i+1 = H(L\_i+1, \text{Session ID})^{-1} \odot H(R\_i+1, \text{Session ID})$$

using Equation (1). This Equation is substituted for Equation (3) to express Equation (3) as shown below.

$$B\_i+1 = H(L\_i+1, \text{Session ID})^{-1} \odot H(R\_i+1, \text{Session ID}) \odot B\_i$$

$$L\_i+1 = R\_i$$

Thus, if the function value B_i of Equation (2) is substituted for Equation (2), the following Equation is established.

$$B\_i+1 = H(R\_i+1, \text{Session ID})$$

According to the above-described principle, an arbitrary node sequentially operates function values B_i+2, B_i+3, ..., and B_i−1. That is, the above-described operation is expressed as shown in the following Equation (4) below.

$$B\_i = H(R\_i, \text{Session ID})$$

$$B\_i+1 = X\_i+1 \odot B\_i$$

$$B\_i+2 = X\_i+2 \odot B\_i+1$$

.

.

.

$$B\_i-1 = X\_i-1 \odot B\_i-2 \quad (4)$$

Final operation values obtained through Equation (4) due to the characteristic of an operation with an inverse can be expressed as shown in the following Equation (5) below.

$$B\_i = H(R\_i, \text{Session ID})$$

$$B\_i+1 = H(R\_i+1, \text{Session ID})$$

$$B\_i+2 = H(R\_i+2, \text{Session ID})$$

.

.

.

$$B\_i-1 = H(R\_i-1, \text{Session ID}) \quad (5)$$

The N nodes node_1, node_2, ..., node_i ..., and node_N generate and store a group key used by the node group using the operation values expressed in Equation (5).

$$K_G = H(B\_1 \| B\_2 \| \ldots \| B\_N-1 \| B\_N) \quad (6)$$

Equation (6) above expresses the group key generated and stored by the N nodes node_1, node_2, ..., node_i ..., and node_N. That is, a group key $K_G$ may be a value provided by connecting function values B_1, B_2, ..., B_i, ..., B_N, that are the operation values obtained through Equations (1) through (5) and substituting the function values B_1, B_2, ..., B_i, ..., B_N, for a hash function. Thereafter, the N nodes node_1, node_2, ..., node_i ..., and node_N share the group key generated through the above-described process.

In embodiments described herein, conceptual circles of nodes are substantially determined as described in the present specification. The group key $K_G$ is generated depending on a direction along which the circles are increased. However, the group key $K_G$ may be generated by those of ordinary skill in the art depending on a direction along which the circles are decreased. In this case, the "R" of variables of Equations (1) through (6) above indicating the right side may be changed into an "L" indicating the left side.

Figure 2:
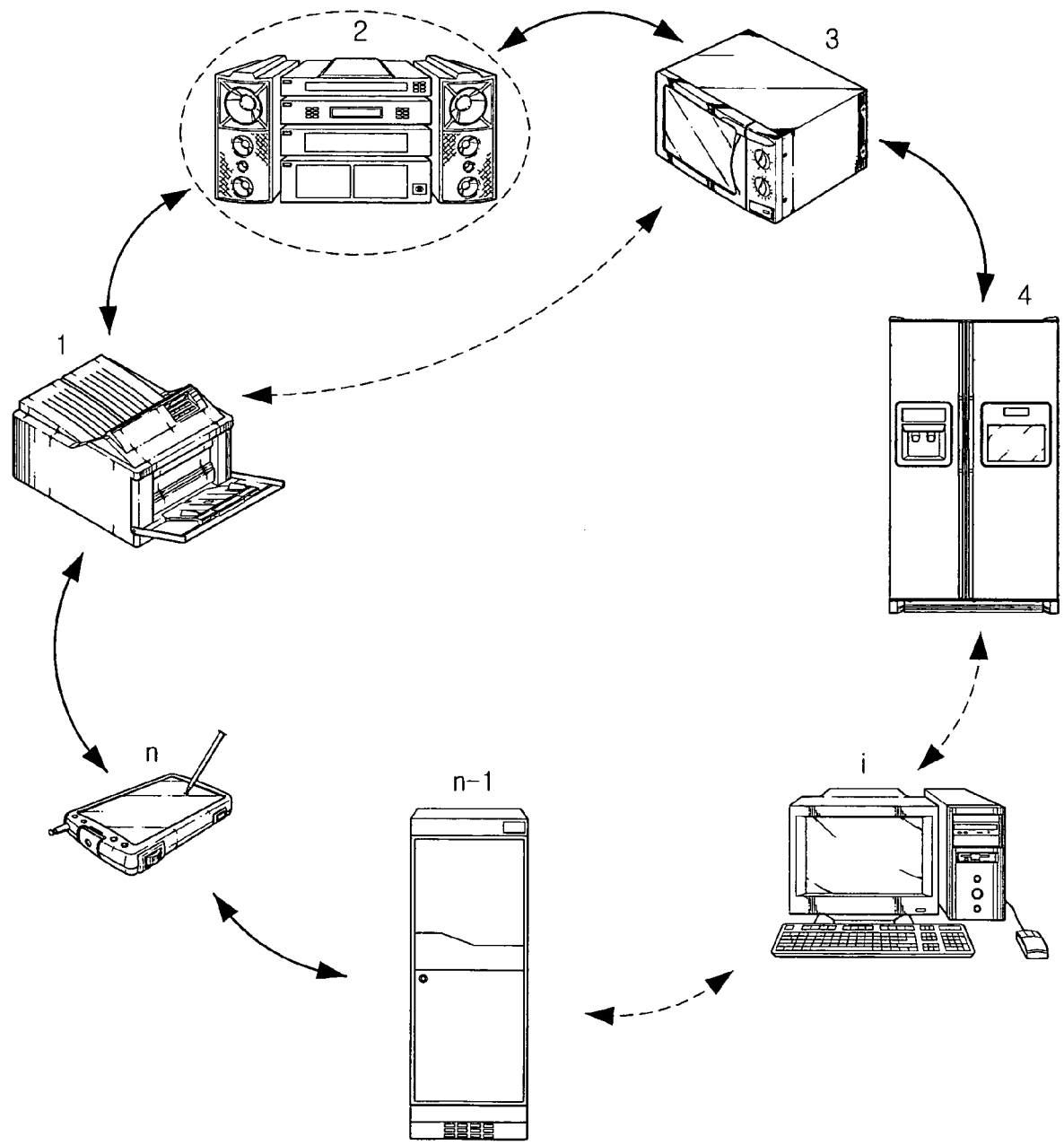
FIG. 2 is a view illustrating an exemplary configuration of a home network for adopting a method for generating a group key according to an example embodiment.

FIG. 2 is a view illustrating an exemplary configuration of a home network for adopting a method for generating a group key according to an example embodiment. Referring to FIG. 2, home devices comprising a node group are numbered to set a conceptual circle.

The home devices may comprise static and mobile devices, but are not limited thereto. In the case where a group key is generated through the above-described process, and then a device 2 is excluded from the home network in a state shown in FIG. 2, only devices 1 and 3 that are adjacent to the device 2 change and store secret keys. Devices not adjacent to device 2 continuously store existing first and second secret keys.

That is, in a case where device 2 is excluded from the home network, device 1 may store a new first secret key shared with device 3 instead of a first secret key R_1 shared with device 2.

Also, device 3 may store a new second secret key shared with device 1 instead of a second secret key L_3 shared with device 2.

Thus, the devices completely share first and second secret keys in a new environment. Thereafter, the devices may generate a new group key $K_G$ through the process described through Equations (1) through (6) above.

As described above, according to various embodiments, a group key can be efficiently generated in an environment in which nodes frequently enter and exit a node group. Also, an exponent operation is not used during the generation of the group key. Thus, computation of the nodes can be reduced, and a server and a public key are not required.

The foregoing embodiments and advantages are merely exemplary and are not to be construed as limiting the present description. The present teachings can also be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of a node for generating a group key applied to a plurality of nodes, the method comprising:
    sharing a first secret key with a first adjacent node of a plurality of adjacent nodes and sharing a second secret key with a second adjacent node of the plurality of adjacent nodes;
    obtaining first and second function values by operating the first secret key and the second key;
    obtaining a first result value using the first and second function values;
    broadcasting the first result value to the plurality of other adjacent nodes;
    receiving other result values from the plurality of other adjacent nodes; and
    performing an operation on a plurality of function values extracted from the first function value and the other result values, to obtain a group key.

2. The method of claim 1, wherein the operation comprises an XOR operation.

3. The method of claim 1, wherein the obtaining of the inner result value comprises:
    substituting the first and the second secret keys as values of a plurality of substitution values for a one-way function to obtain the first and second function values; and
    performing an operation on the first and the second function values to obtain the result value.

4. The method of claim 3, wherein the operation comprises an XOR operation.

5. The method of claim 3, wherein the plurality of substitution values comprise a nonce value.

6. The method of claim 5, further comprising generating the nonce value using time information.

7. The method of claim 1, further comprising broadcasting the result value through an authentication channel.

8. The method of claim 1, further comprising sharing the first and second secret keys using an out of band method.

9. The method of claim 1, further comprising pre-setting the first and second secret keys.

10. The method of claim 9, further comprising inputting the pre-set first and second secret keys.

11. A method of a node for generating a group key applied to a plurality of nodes, the method comprising:
    sharing a plurality of secret keys with a plurality of other nodes adjacent to the node;
    obtaining a plurality of function values by operating the plurality of secret keys;
    obtaining a first result value using the plurality of function values;
    broadcasting the first result value;
    receiving a plurality of other result values generated based on the first result value, from the plurality of other nodes; and
    obtaining a group key using the plurality of function values and the plurality of other result values.

12. A non transitory computer-readable medium including instructions for causing a processor to implement a method of a node for generating a group key applied to a plurality of nodes, the method comprising:
    sharing a plurality of secret keys with a plurality of other nodes adjacent to the node;

obtaining a plurality of function values by operating the plurality of secret keys and for obtaining a first result value using the plurality of function values;

broadcasting the first result value;

receiving a plurality of other result values generated based on the first result value, from the plurality of other nodes; and obtaining a group key using the plurality of function values and the plurality of other result values.

13. The method of claim 1, wherein the first result value is obtained by operating the first function value and an inverse of the second function value.

* * * * *